US008857858B2

(12) United States Patent
Minich et al.

(10) Patent No.: US 8,857,858 B2
(45) Date of Patent: Oct. 14, 2014

(54) TAPPING SLEEVE TIGHTENING ASSEMBLY (71) Applicants: Raymond C. Minich, Bradford, PA (US); Daryl M. Piontek, Great Valley, NY (US)

(72) Inventors: Raymond C. Minich, Bradford, PA (US); Daryl M. Piontek, Great Valley, NY (US)

(73) Assignee: Total Piping Solutions, Inc., Olean, NY (US)

( * ) Notice: Subject to any disclaimer, the term of this patent is extended or adjusted under 35 U.S.C. 154(b) by 0 days.

(21) Appl. No.: 13/828,873

(22) Filed: Mar. 14, 2013

(65) Prior Publication Data

US 2014/0261760 A1 Sep. 18, 2014

(51) Int. Cl.
F16L 41/04 (2006.01)
F16L 41/06 (2006.01)

(52) U.S. Cl.
CPC ..................................... F16L 41/06 (2013.01)
USPC ........................................... 285/197; 285/373

(58) Field of Classification Search
USPC ............... 285/373, 419, 197, 198, 199
See application file for complete search history.

(56) References Cited

U.S. PATENT DOCUMENTS

| | | | | |
|---|---|---|---|---|
| 1,510,394 A * | 9/1924 | Frazier | ........................... | 285/373 |
| 2,684,859 A * | 7/1954 | Longley | ........................ | 285/199 |
| 3,089,212 A * | 5/1963 | Graham et al. | ............... | 285/373 |
| 3,204,665 A * | 9/1965 | Faint | .............................. | 285/373 |
| 3,558,162 A * | 1/1971 | Ferrai et al. | .................... | 285/197 |
| 3,599,995 A | 8/1971 | Rafalski | | |
| 3,792,879 A * | 2/1974 | Dunmire et al. | .............. | 285/197 |
| 4,413,388 A * | 11/1983 | Akhtar-Khavari et al. | ... | 285/373 |
| 4,630,647 A * | 12/1986 | Thomson | ....................... | 285/417 |
| 4,708,373 A * | 11/1987 | Morriss, Jr. | .................... | 285/197 |
| 5,040,828 A * | 8/1991 | Kane | .............................. | 285/197 |
| 5,358,286 A * | 10/1994 | Eaton et al. | .................... | 285/197 |
| 5,362,107 A | 11/1994 | Bridges | | |
| 5,374,087 A | 12/1994 | Powers | | |
| 6,173,967 B1 | 1/2001 | Eskew et al. | | |
| 6,227,234 B1 | 5/2001 | Powers | | |
| 6,360,771 B2 | 3/2002 | Powers | | |
| 7,070,209 B2 | 7/2006 | Collins | | |
| 7,104,572 B1 * | 9/2006 | Kane | ............................. | 285/197 |
| 7,232,160 B2 | 6/2007 | Krausz et al. | | |
| 8,042,234 B2 | 10/2011 | Rigollet et al. | | |
| 8,176,929 B1 * | 5/2012 | Collins | ......................... | 285/197 |
| 8,651,530 B2 * | 2/2014 | Krausz et al. | ................. | 285/197 |
| 2012/0192963 A1 | 8/2012 | Minich et al. | | |
| 2012/0193909 A1 * | 8/2012 | Minich et al. | ................. | 285/197 |

* cited by examiner

Primary Examiner — David E Bochna
(74) Attorney, Agent, or Firm — Phillips Lytle LLP (57) ABSTRACT A tapping sleeve assembly comprising a sleeve having first and second shells, a gasket, a connection assembly comprising first and second side bar elements connected to the first and second shells, respectively, multiple lugs extending from the first and second side bar elements, and a bolt extending between each of the respective lugs, the first side bar element comprising an upper leg connected to the first shell at an upper connection, a lower leg supporting at least one of the lugs, an intermediate bearing unit configured to bear against the first shell, and the bearing unit having at least one bearing surface not affixed to the outer surface of the first shell, whereby the first and second side bar elements may be drawn towards each other to tighten the sleeve to a conduit.

32 Claims, 11 Drawing Sheets

TAPPING SLEEVE TIGHTENING ASSEMBLY

TECHNICAL FIELD

The present invention relates generally to the field of pipe fittings, and more particularly to an improved tapping sleeve tightening assembly.

BACKGROUND ART

Tapping sleeves are used to enable or permit branch connections to be made to fluid carrying (i.e. water main for distribution) pipes and pipelines. Current tapping sleeve designs typically employ a connection assembly for the sleeve having an "A" lug type design. Such designs are shown, for example, in U.S. Pat. Nos. 5,040,828, 6,173,967, 6,227,234 and 6,360,771.

BRIEF SUMMARY OF THE INVENTION

With parenthetical reference to corresponding parts, portions or surfaces of the disclosed embodiment, merely for the purposes of illustration and not by way of limitation, the present invention provides an improved tapping sleeve assembly (14) comprising a sleeve (15) configured to clamp on to a main fluid conduit oriented about a longitudinal axis; the sleeve having a first shell member (34) and a second shell member (40) separate from the first shell member; a gasket (17) disposed between the first shell member and the main fluid conduit; a branch aperture (23) in the first shell member configured to communicate with a branch fluid conduit (29) attached to the first shell member; a connecting assembly (21a, 21b) configured and arranged to tighten the first and the second shell members to the main fluid conduit from a non-actuated position to a tightened position; the connection assembly comprising: a first side bar element (19a, 119a, 219a, 319a, 419a) connected proximate to a longitudinally extending edge (73a) of the first shell member and a second side bar element (24a) connected proximate to a longitudinally extending edge (74a) of the second shell member; multiple bolt receiving lugs (26a-g) extending from the first side bar element and multiple bolt receiving lugs (28a-g) extending from the second side bar element at corresponding positions along the longitudinal axis; and a bolt (18a-g) extending between each of the respective lugs on the first side bar element and the second side bar element; the first side bar element comprising: an upper leg (45, 145, 245, 345) having an upper edge (46, 146, 246) and connected to the first shell member at an upper connection (48, 148, 248, 348); a lower leg (49, 149, 249, 349) having a lower edge (50, 150, 250) and connected to the upper leg and supporting at least one of the bolt receiving lugs; an intermediate bearing unit (52, 152a, 152b, 152c, 252a, 252b, 252c, 352) configured and arranged to bear against an outer surface (35) of the first shell member between the upper edge of the upper leg and the lower edge of the lower leg; and the bearing unit having at least one bearing surface (53, 153a, 153b, 153c, 253a, 253b, 253c, 353) not affixed to the outer surface of the first shell member; whereby the first side bar element and the second side bar element may be drawn towards each other to tighten the first and second members to the main fluid conduit.

The bearing unit may comprise a bearing projection (52, 152b, 252b) extending towards the outer surface of the first shell member from the lower leg. The bearing unit may comprise a bearing projection (52, 152a, 152b, 152c, 252a, 252b, 252c) extending towards the outer surface of the first shell member from the upper leg and/or the lower leg. The bearing projection may comprise a longitudinally extending rod (252a, 252b, 252c) attached to the upper leg and/or the lower leg. The rod (252a) may be attached to the first side bar element at a junction (254) between the upper leg and the lower leg. The bearing unit may comprise multiple bearing projections (152a-c, 252a-c) extending towards the outer surface of the first shell member from the upper leg and/or the lower leg. Each of the bearing projections may comprise a longitudinally extending rod (252a-c). The bearing surface may comprise a continuous curved surface (353) having a curvature substantially similar to a corresponding curvature of the outer surface of the first shell member. The upper leg may comprises a longitudinally extending plate and the lower leg may comprise a longitudinally extending plate connected to the upper leg plate. The lower leg may be connected to the shell at a lower connection (51, 151, 251). The lower connection may comprise a weld between the lower edge (50, 150, 250) of the lower leg and the longitudinally extending edge (73a) of the first shell member. The upper connection may comprise a weld between the upper edge (46, 146, 246) of the upper leg and the first shell member. The first side bar element and lugs may be formed as a unitary solid piece (419a). The lug may comprise a moment reaction wing (96, 97). The second side bar element (24a) may comprises: a lower leg (45b) having an lower edge (46b) and connected to the second shell member at a lower connection (48b); an upper leg (49b) having an upper edge (50b) and connected to the lower leg and supporting at least one of the bolt receiving lugs; a bearing unit 52(b) configured and arranged to bear against an outer surface (35b) of the second shell member between the lower edge of the lower leg and the upper edge of the upper leg; and the bearing unit having at least one bearing surface (53b) not affixed to the outer surface of the second shell member.

In another aspect a tapping sleeve assembly is provided comprising: a sleeve configured to clamp on to a main fluid conduit oriented about a longitudinal axis; the sleeve having a first shell member and a second shell member separate from the first shell member; a gasket disposed between the first shell member and the main fluid conduit; a branch aperture in the first shell member configured to communicate with a branch fluid conduit attached to the first shell member; a connecting assembly configured and arranged to tighten the first and the second shell members to the main fluid conduit from a non-actuated position to a tightened position; the connection assembly comprising: a first side bar element connected proximate to a longitudinally extending edge of the first shell member and a second side bar element connected proximate to a longitudinally extending edge of the second shell member; multiple bolt receiving lugs extending from the first side bar element and multiple bolt receiving lugs extending from the second side bar element at corresponding positions along the longitudinal axis; and a bolt extending between each of the respective lugs on the first side bar element and the second side bar element; the first side bar element comprising: an upper leg (45, 145, 245, 345) and a lower leg (49, 149, 249, 349) connected at a leg junction (54, 154, 254, 354); the upper leg connected to the first shell member at an upper force transfer connection (48, 148, 248); the lower leg configured to apply a force to the first shell member at a lower force transfer connection (51, 151, 251, 351); the lower leg orientated relative to the upper leg such that an inner angle (55, 155, 255, 355) defined by the intersection of a first imaginary plane between the upper connection and the leg junction and a second imaginary plane between the lower connection and the leg junction is greater than about 90 degrees and less than about 180 degrees.

The inner angle may be greater than about 120 degrees. The lower leg may be connected to the first shell member at the lower force transfer connection. The lower force transfer connection may comprise a weld between a lower edge of the lower leg and the longitudinally extending edge of the first shell member. The upper force transfer connection may comprise a weld between an upper edge of the upper leg and the first shell member.

In another aspect, a tapping sleeve assembly is provided comprising: a sleeve configured to clamp on to a main fluid conduit oriented about a longitudinal axis; the sleeve having a first shell member and a second shell member separate from the first shell member; a gasket disposed between the first shell member and the main fluid conduit; a branch aperture in the first shell member configured to communicate with a branch fluid conduit attached to the first shell member; a connecting assembly configured and arranged to tighten the first and the second shell members to the main fluid conduit from a non-actuated position to a tightened position; the connection assembly comprising: a first side bar element connected proximate to a longitudinally extending edge of the first shell member and a second side bar element connected proximate to a longitudinally extending edge of the second shell member; multiple bolt receiving lugs extending from the first side bar element and multiple bolt receiving lugs extending from the second side bar element at corresponding positions along the longitudinal axis; and a bolt extending between each of the respective lugs on the first side bar element and the second side bar element; the first side bar element comprising: an upper leg and a lower leg connected at a leg junction; the upper leg connected to the first shell member at an upper force transfer connection; the lower leg configured to apply a force to the first shell member at a lower force transfer connection; the lower leg orientated relative to the upper leg such that an off-tangent angle (56, 156, 256, 356) defined by an intersection of a first imaginary plane (64) tangent to the first shell member at the upper force transfer connection and a second imaginary plane (65) between the upper force transfer connection and the leg junction (65) is less than about 30 degrees.

The off-tangent angle may be less than about 10 degrees. The off-tangent angle may be less than about 5 degrees. The lower leg may be connected to the first shell member at the lower force transfer connection. The lower force transfer connection may comprise a weld between a lower edge of the lower leg and the longitudinally extending edge of the first shell member. The upper force transfer connection may comprise a weld between an upper edge of the upper leg and the first shell member.

In another aspect, a tapping sleeve assembly is provided comprising: a sleeve configured to clamp on to a main fluid conduit oriented about a longitudinal axis; the sleeve having a first shell member and a second shell member separate from the first shell member; a gasket disposed between the first shell member and the main fluid conduit; a branch aperture in the first shell member configured to communicate with a branch fluid conduit attached to the first shell member; a connecting assembly configured and arranged to tighten the first and the second shell members to the main fluid conduit from a non-actuated position to a tightened position; the connection assembly comprising: a first side bar element connected proximate to a longitudinally extending edge of the first shell member and a second side bar element connected proximate to a longitudinally extending edge of the second shell member; a bolt extending in a first load plane (60) between each of the respective lugs on the first side bar element and the second side bar element; the first side bar element comprising: an upper leg and a lower leg connected at a leg junction; the upper leg configured to transfer a force to the shell member at an upper connection in a force transfer plane (61) when said bolts are loaded in said first load plane; the lower leg configured to apply a force to the first shell member at a lower force transfer connection; the lower leg orientated relative to the upper leg such that an off-tangent angle defined by an intersection of a first imaginary plane tangent to the first shell member at the upper force transfer connection and the force transfer plane is less than about 30 degrees.

The off-tangent angle may be less than about 10 degrees. The off-tangent angle may be less than about 5 degrees. The upper leg may be connected to the first shell member at the upper force transfer connection and the lower leg may be connected to the first shell member at the lower force transfer connection. The upper force transfer connection may comprise a weld between an upper edge of the upper leg and the first shell member and the lower force transfer connection may comprise a weld between a lower edge of the lower leg and the longitudinally extending edge of the first shell member.

DETAILED DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
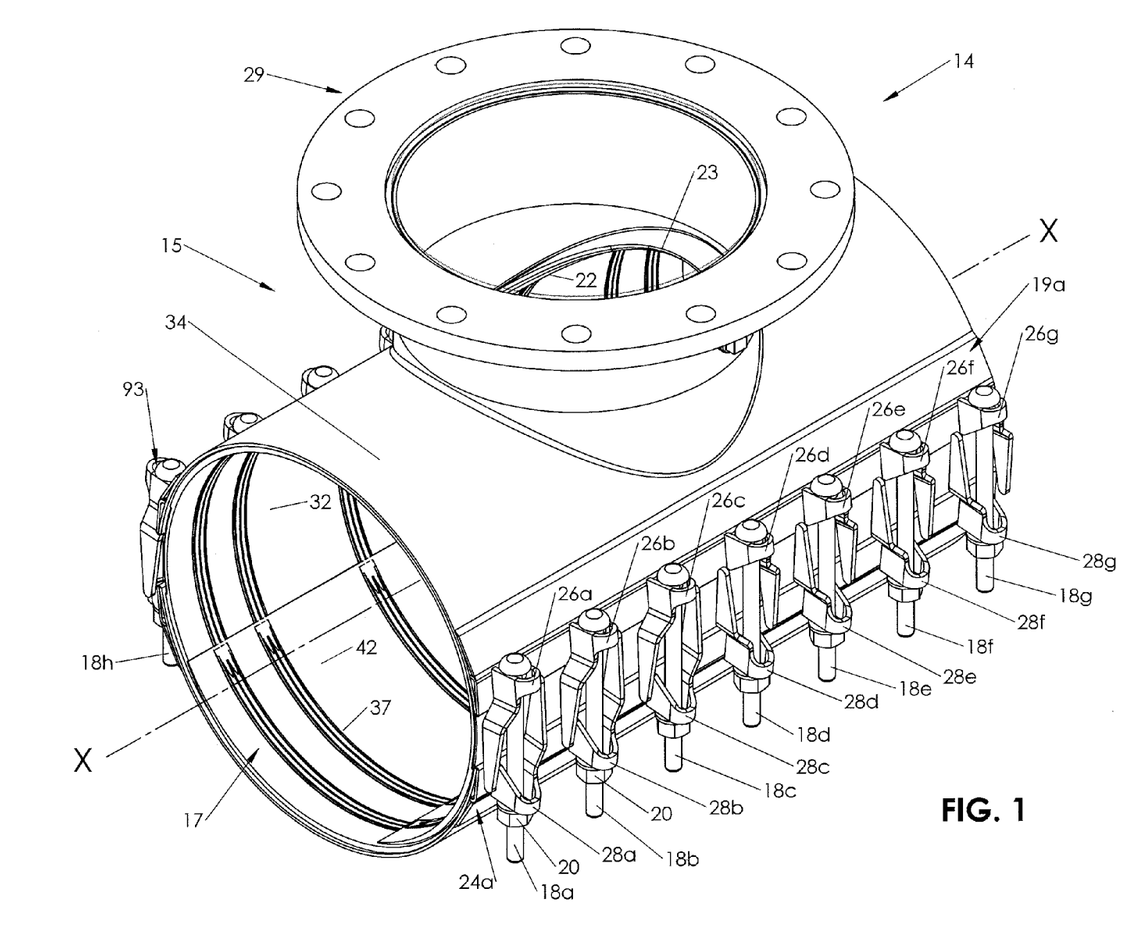
FIG. 1 is a top isometric view of an embodiment of the improved tapping sleeve tightening assembly.
Figure 2:
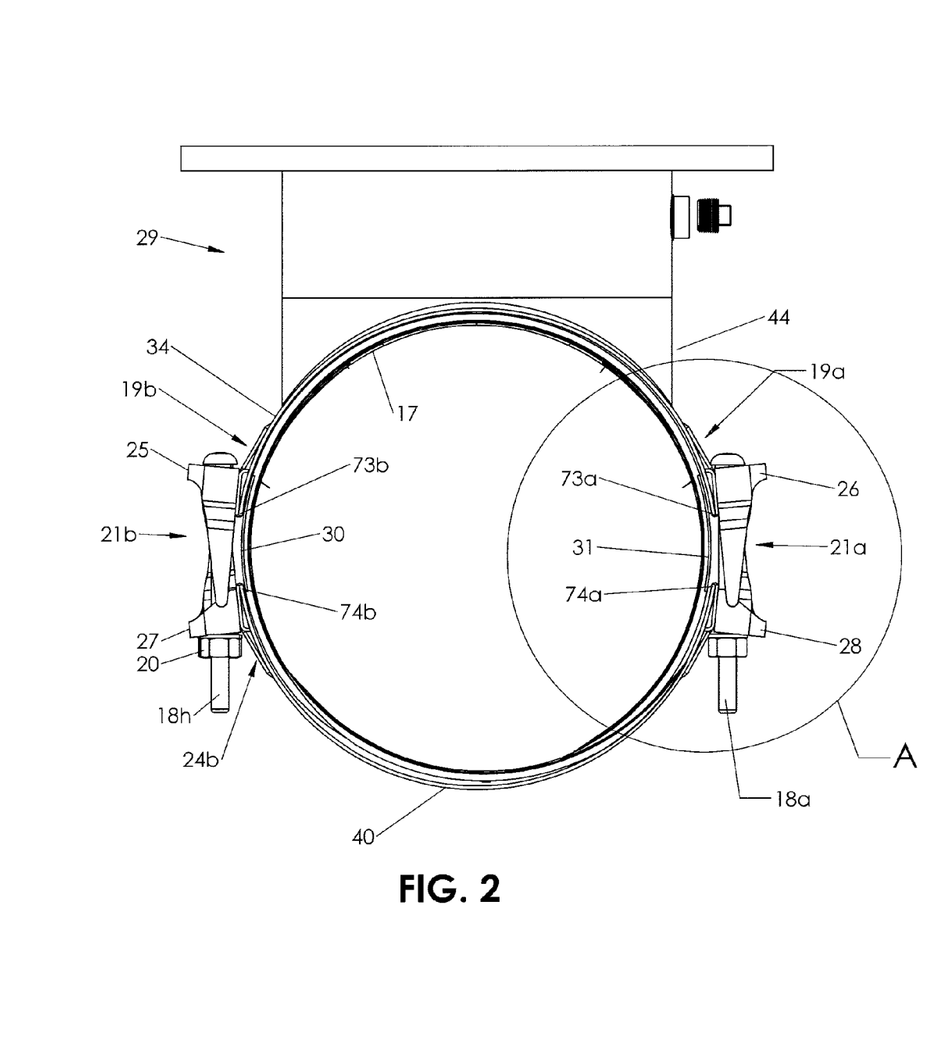
FIG. 2 is a left side view of the tapping sleeve assembly shown in FIG. 1.
Figure 3:
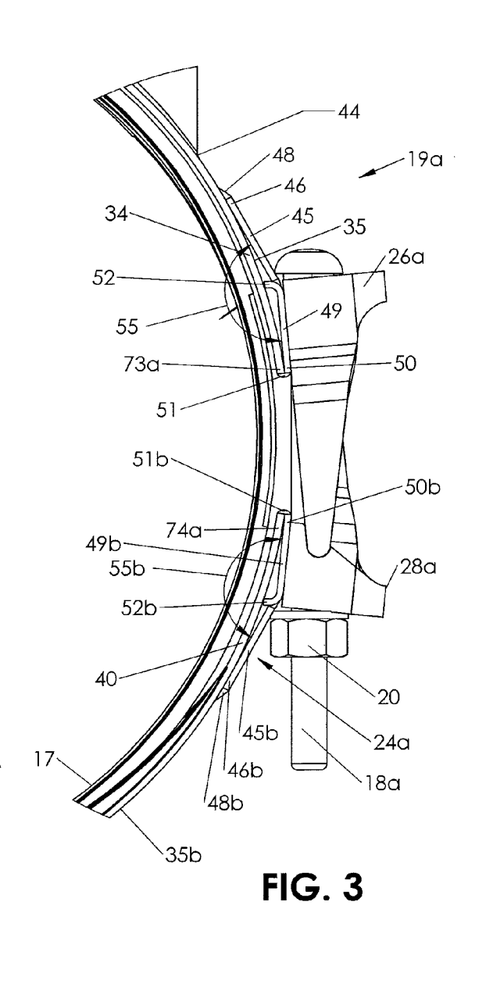
FIG. 3 is an enlarged detailed view of the tapping sleeve assembly shown in FIG. 2, taken generally within the indicated circle A of FIG. 2.
Figure 4:
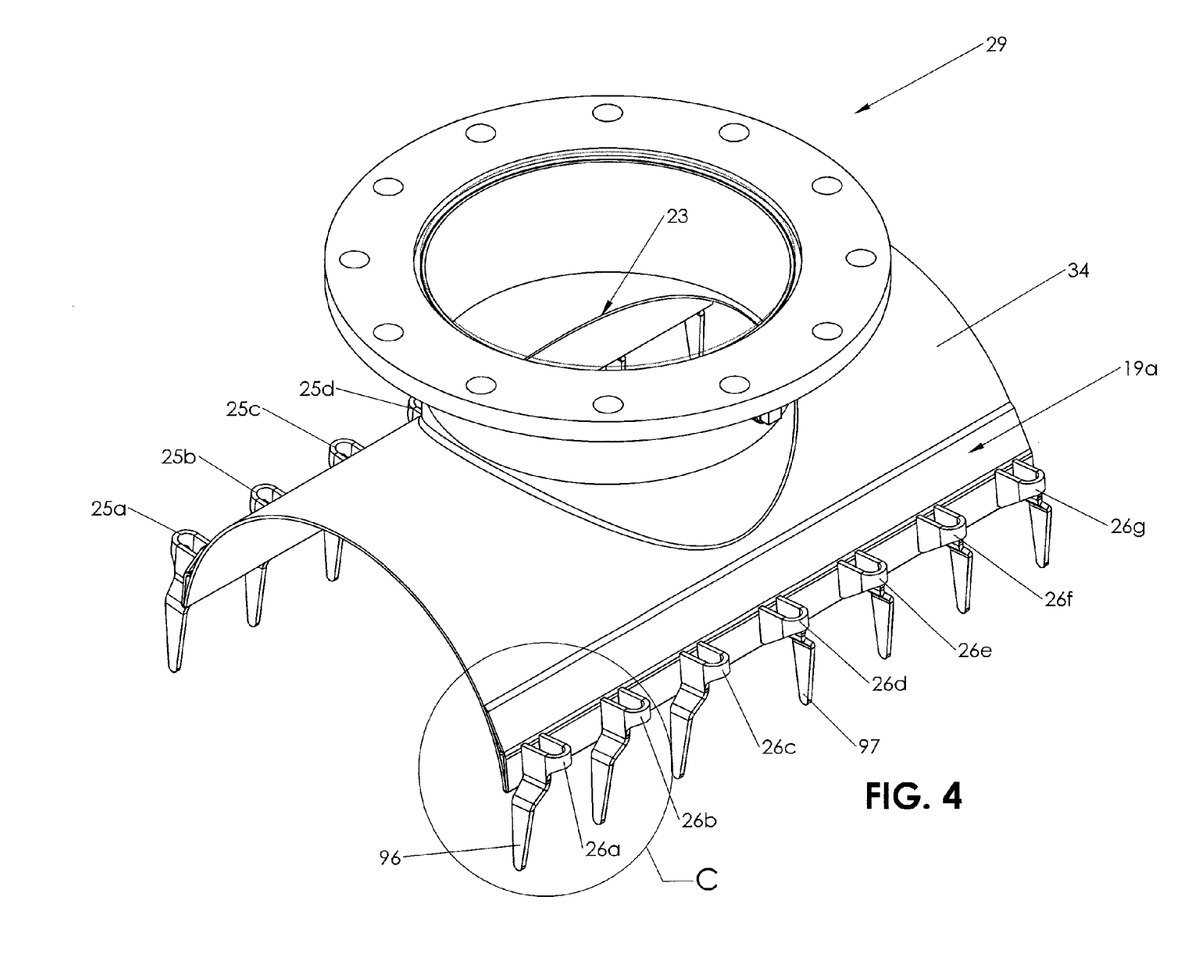
FIG. 4 is a top isometric view of the upper shell branch conduit and upper side bar shown in FIG. 1.
Figure 5:
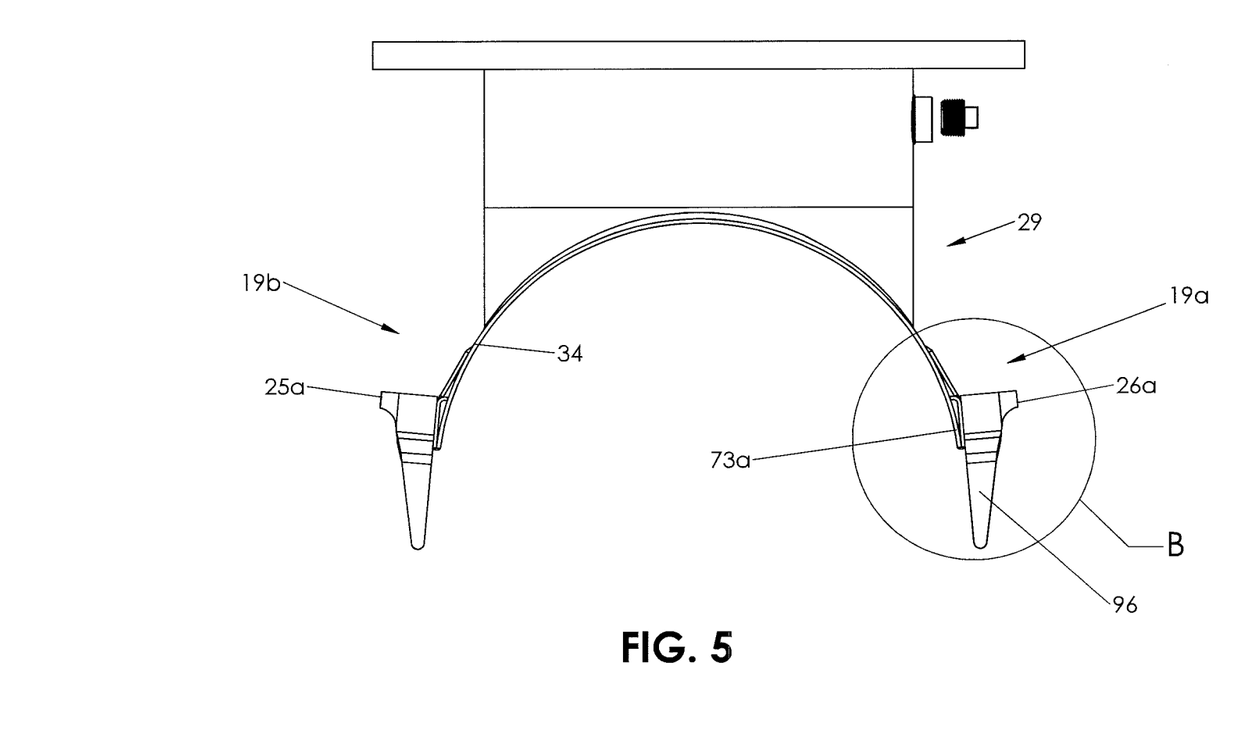
FIG. 5 is a left side view of the upper shell assembly shown in FIG. 4.

Referring now to the drawings, and more particularly to FIG. 1 thereof, this invention provides an improved tapping sleeve and gasket assembly, of which a first embodiment is generally indicated at 14. As shown in FIGS. 1-3, assembly 14 generally comprises tapping sleeve 15, which in operation is mounted on the outside of a main pipe or fluid conduit (not shown), and gasket 17, which in operation is disposed between the main pipe and sleeve 15.

Tapping sleeve 15 includes semi-cylindrical top half shell 34, semi-cylindrical lower half shell 40, and spanners 30 and 31. Top half shell 34 and bottom half shell 40 are connected and tightened around pipe 16 with connection assembly 21a and 21b.

Gasket 15 includes upper gasket 32 and lower spanning gasket 42. As described in further detail below, upper gasket 32 and lower gasket 42 are flexible elastomeric matte gasket sheets having specially contoured raised or thickened sealing beads, including circumferential seal beads 37 and thickened branch aperture seal 22 on upper gasket 32.

Tapping sleeve assembly 14 is formed by joining and welding in place a cylindrical branch connection 29 to top half shell 34, which is then mated to the fluid carrying pipe with upper gasket 32, lower half shell 40 and lower gasket 42. Gaskets 32 and 42 are sandwiched between the inside cylindrical surfaces of shells 34 and 40 and the outside cylindrical surface of the main fluid carrying pipe to provide sufficient sealing force to prevent leakage of fluid from the interface once a tap is made into the fluid carrying pipe through branch outlet 29. Elastic (sealing) energy is imparted into the structure by tightening actuating connections 21a and 21b from a loosened or non-actuated position to a tightened sealed position.

Upper gasket 32 is sized to encircle substantially completely the outside diameter of the smallest diameter fluid carrying pipe for the given sleeve size. Lower matte gasket 42 is sized to span the zone of reduced gasket thickness and any gap between the longitudinal tapered proximal edge portions of lower gasket 32. Thus, as the pipe diameter on which assembly 14 is installed increases, the ends of upper matte gasket 32 separate, and lower matte gasket 42 further engages upper gasket 32 to continue the sealing action.

Lower gasket 42 includes inwardly extending raised seal beads that running circumferentially and transversely to the longitudinal axis x-x of the pipe. The inner seal beads face the outer surface of the main fluid carrying pipe to provide for increased localized gasket sealing pressure.

Upper gasket 32 is formed of a flexible sheet with a specially contoured thickened aperture seal 22 and multiple transversely extending protruding or raised inner circumferential seal beads 37. Main aperture seal 22 could be molded separately from the remainder of gasket 32, thereby allowing for different main seal profiles to be used interchangeably, which provide manufacturing costs reductions and improved inventory efficiency.

Upper gasket 32 includes inwardly extending raised seal beads 37 that running circumferentially and transversely to longitudinal axis x-x of the fluid carrying pipe. Inner seal beads 37 face the outer surface of the fluid carrying pipe to provide for increased localized gasket sealing pressure. These circumferential seal beads provide for improved seal performance if the main fluid carrying pipe should suffer a complete circumferential break, as is possible when tapping sleeve 14 is used to branch into brittle conductor pipe materials such as ductile iron, asbestos cement or concrete pipe materials. These circumferential raised seal beads provide matte gasket stiffening support, and prevent the matte gasket from undergoing extrusion at the shell free ends.

Circumferential seal beads 37 utilize a double o-ring radial inwardly-facing geometry. Thus, the main matte gasket circumferential seal beads (both upper and lower gasket sheets) have parallel (double) seal beads of semicircular cross section, raised by pedestal above the main gasket sheet sealing surface, to provide for increased seal pressure and seal reliability.

Branch aperture seal 22 has a varying, non-uniform thickness relative to axis x-x and is substantially set back or separated from branch line 29 to upper shell 34 connection 54 by a varying and non-uniform distance.

As shown in FIG. 2, spanners 30 and 31 are metallic strips that span the arc shaped gap between the longitudinally extending edges 73 and 74 of top half-shell 34 and lower half-shell 40, respectively, using the compression force exerted by the top and lower half-shell edges as sleeve 15 is tightened to the fluid carrying pipe to compress matte gaskets 32 and 42 to the fluid carrying pipe.

As shown in FIGS. 1-7, specially configured side bars 19a and 19b are welded to the two edges 73a and 73b, respectively, of top shell 34 that are coincident with longitudinal axis x-x of the pipe. Similarly, specially configured side bars 24a and 24b are welded to the two edges 74a and 74b of lower shell 40 that are coincident with longitudinal axis x-x of the pipe.

Figure 6:
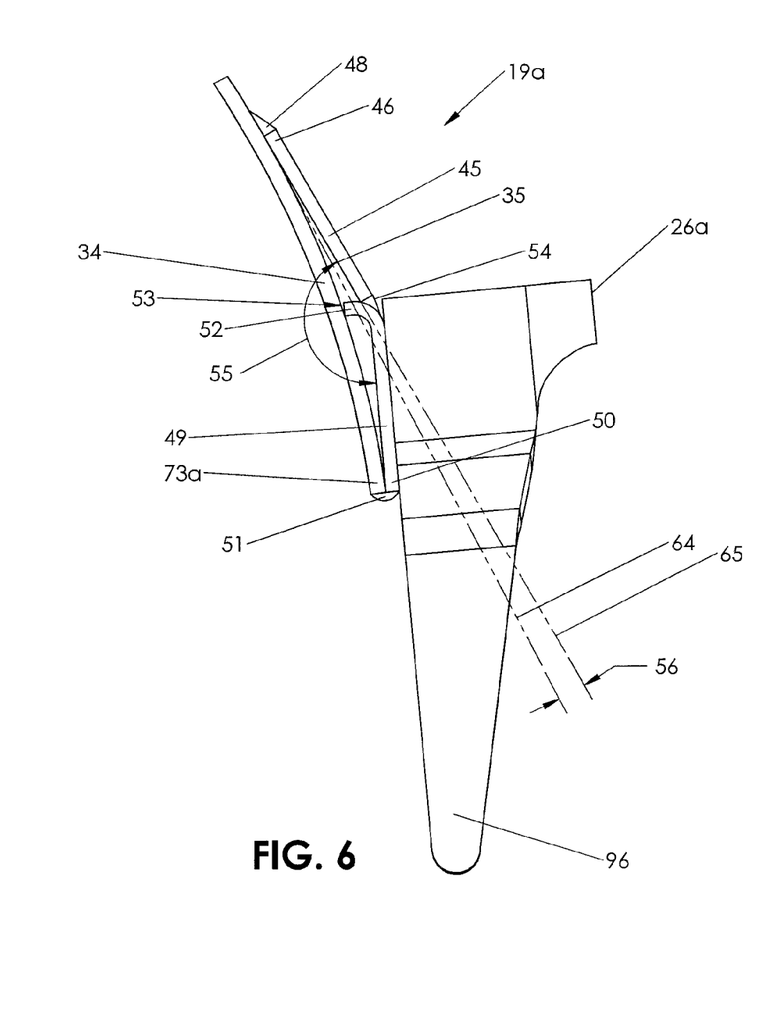
FIG. 6 is an enlarged view of the lug and side bar shown in FIG. 5, taken generally within the indicated circle B of FIG. 5.
Figure 7:
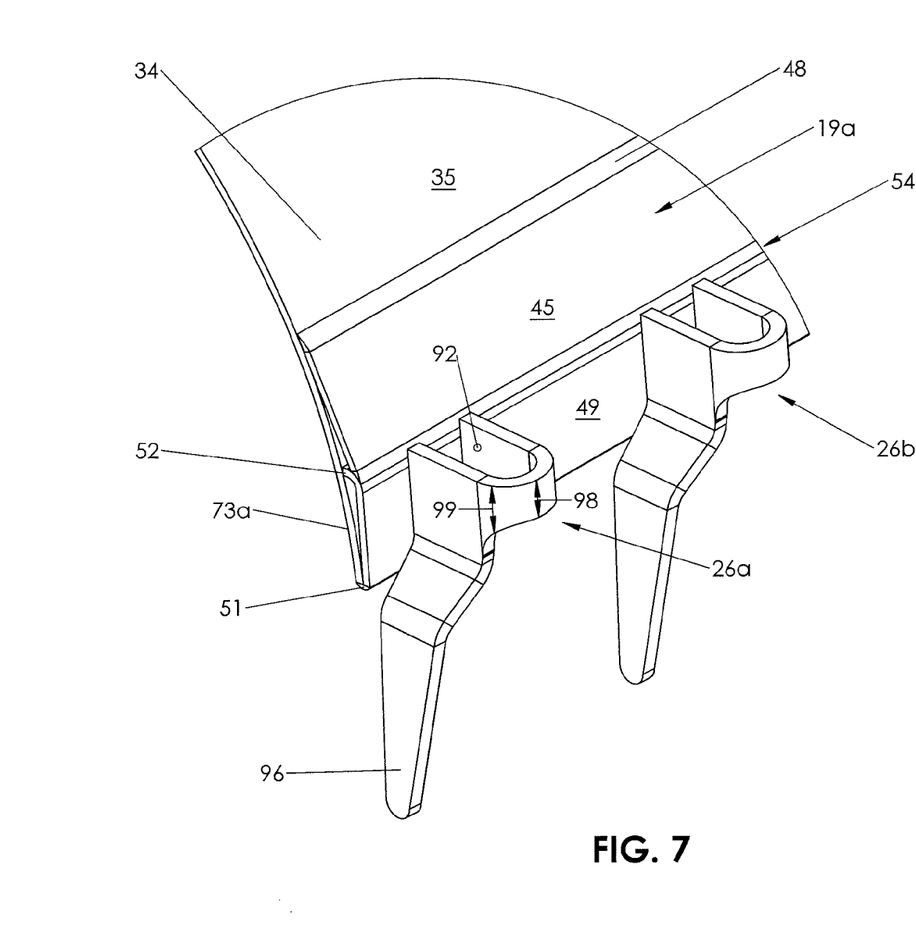
FIG. 7 is an enlarged view of the lugs and side bar shown in FIG. 4, taken within the indicated circle C of FIG. 4.

As shown in FIG. 6, in a first embodiment side bar 19a generally comprises longitudinally extending upper leg 45 connected at longitudinally extending junction 54 to longitudinally extending lower leg 49, with the plane of lower leg 49 offset about junction 54 from the plane of upper leg 45 by inner angle 55. Inner angle 55 between upper leg 45 and lower leg 49 is greater than about 90 degrees and less than about 180 degrees, and preferably less than about 120 degrees. Upper edge 46 of upper leg 45 is welded longitudinally to outer surface 35 of top shell 34 at longitudinally extending connection 48. Lower edge 50 of lower leg 49 is in turn welded longitudinally to longitudinal edge 73a of top shell 34 at longitudinally extending connection 51. As shown, in this embodiment upper connection 48 is provided such that the plane of upper leg 45, or the plane of the force transfer along leg 48 when lugs 26a-g are loaded with tightening of bolts 18a-g, is offset from an imaginary plane tangent to outer surface 35 of top shelf 34 at connection 48 by angle 56. Off-tangent angle 56 is less than about 30 degrees, and preferably less than about 5 degrees. In this embodiment, off-tangent angle 56 is about 3 degrees.

As shown, intermediate leg 52 extends from junction 54 of side bar 19a. The longitudinally extending end surface 53 of projection 52 bears against outer surface 35 of top shelf 34 between upper junction 48 and lower junction 51. Leg 52 is not fixedly connected to shell 34 and is thereby allowed to float. This serves to add to the radial inwardly directed gasket force applied by shell 34 when sleeve 15 is tightened. Because there is no fixed connection between spacer 52 and shell 34, under certain loading conditions spacer 52 may translate away from shell 34 without pulling shell 34 outward at that point, and under other loading conditions may slide and push radially inward as material is stretched, which assists in applying gasket pressure in the subject region of shell 34. While in this embodiment lower leg 49 is welded to shell 34 at connection 51, is contemplated that end 50 of lower leg 49 may be provided without a weld and may be allowed to move relative to edge 73a of shell 34.

Figure 8:
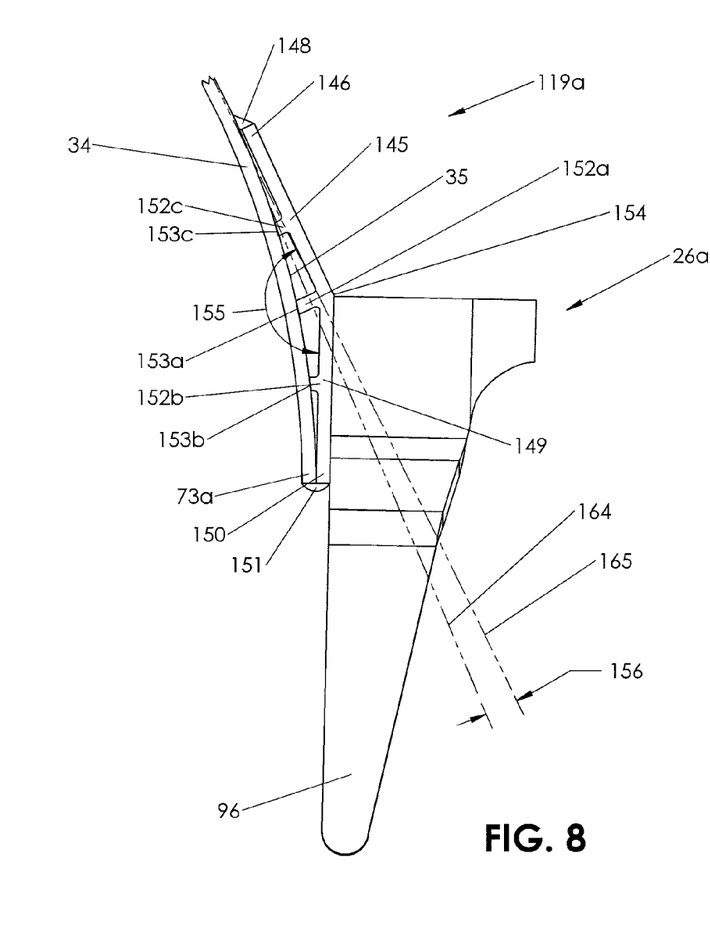
FIG. 8 is a first alternative embodiment of the side bar shown in FIG. 6.

An alternative embodiment 119a of side bar 19a is shown in FIG. 8. Side bar 119a is somewhat similar to side bar 19a. It comprises upper leg 145 having longitudinally extending edge 146 connected to top shell 34 at longitudinally extending connection 148 and lower leg 149 connected at longitudinally extending edge 150 to the longitudinally extending edge 73a of shell 34 at longitudinally extending connection 151. Upper leg 145 is offset from lower leg 149 about junction 154 by inner angle 155. Also, upper connection 148 is configured such that the plane 165 of upper leg 145 has an off-tangent angle 156 relative to a plane 164 tangent to surface 35 of shell 34 at connection 148. However, in this embodiment side bar 119a includes three projections or spacers 152a-152c. The middle and longest projection 152a extends from junction 154 and has an end bearing surface 153a that bears against outer surface 35 of shell 34. Second and shorter projection 152c extends from upper leg 145 and has an end bearing surface 153a that bears against outer surface 35 of shell 34 closer to upper connection 148. A third and shorter projection 152b extends from lower leg 149 towards outer surface 35 of shell 34 and has an end bearing surface 153b that bears against outer surface 35 of shell 34 closer to lower connection 151. Projections 152a-152c are not welded to shell 34 and therefore are configured to float and to apply inward radial forces to shell 34 depending on loading conditions. Such multiple projections provide additional radial inwardly directed gasket forces being applied to shell 34 under optimal loading conditions when tapping sleeve 15 is tightened around the main conduit or pipe.

Figure 9:
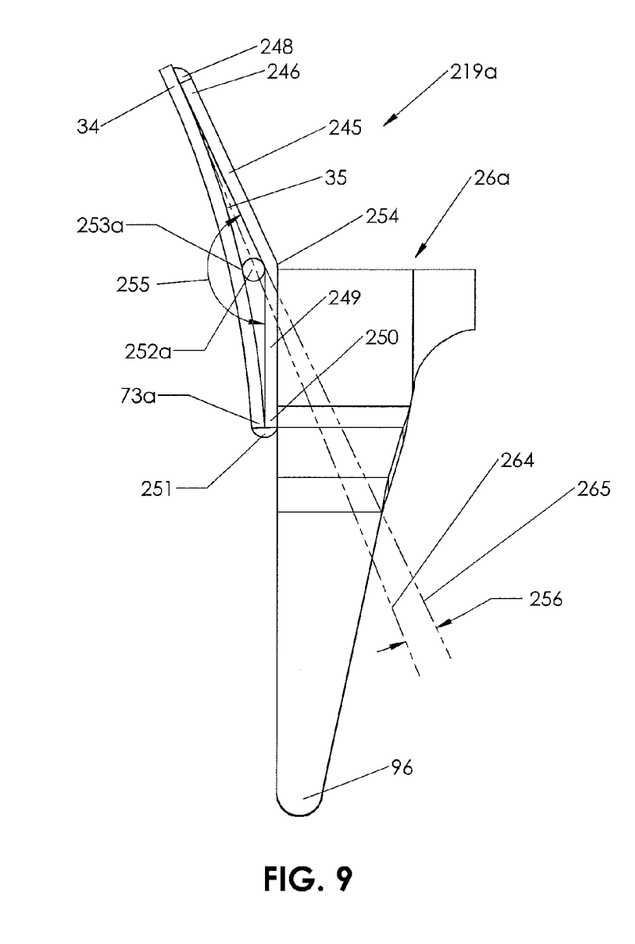
FIG. 9 is a second alternative embodiment of the side bar shown in FIG. 6.

FIG. 9 shows second alternative embodiment side bar 219a. This third embodiment 219a includes upper leg 245 connected at longitudinally extending junction 254 to lower leg 249, with upper leg 245 and lower leg 249 offset about junction 254 by inner angle 255. Upper leg 245 is connected at upper end 246 to shell 34 at longitudinally extending welded connection 248 and lower leg 249 is in turn welded at its lower longitudinally extending end 250 to longitudinally extending edge 73a of shell 34 at longitudinally extending welded connection 251. As shown, upper leg 245 is connected to shell 34 at attachment 248 so as to provide an off tangent angle 256, representatively shown relative to the intersection of lines 264 and 265, of less than about 30 degrees, and preferably less than about 10 degrees. However, in this embodiment, longitudinally extending rod 252a is tack welded to the inside arc of junction 254 between upper leg 245 and lower leg 249. Thus, rod 252a extends longitudinally along the inside of junction 254 the length of side bar 291a. Longitudinally extending inner surface 253a of rod 252a thereby bears against outer surface 35 of top shelf 34 under loaded conditions. Rod 252a is not welded directly to shell 34 and is thereby able to float relative to surface 35 of shell 34.

Figure 10:
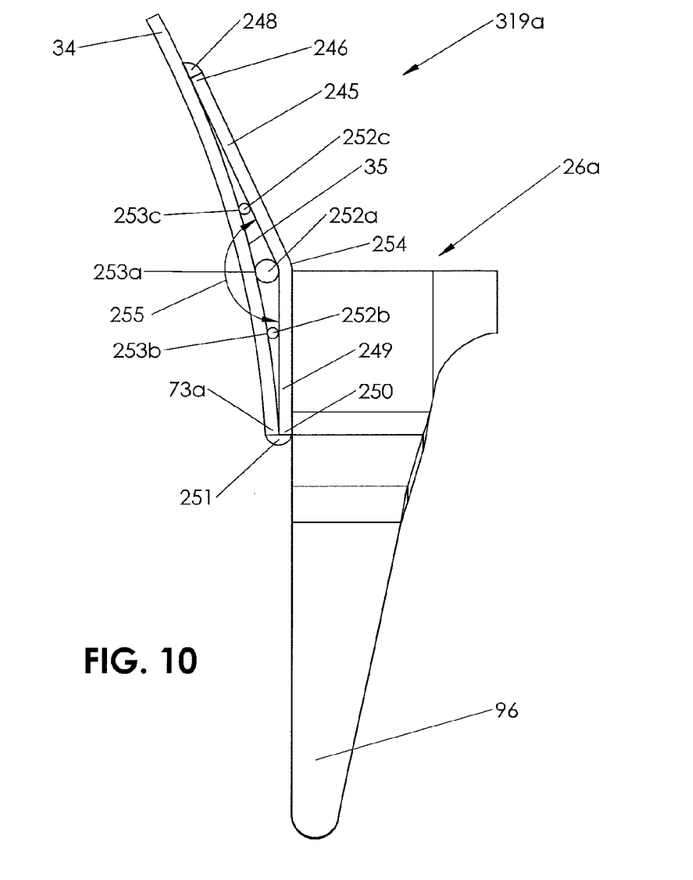
FIG. 10 is a third alternative embodiment of the side bar shown in FIG. 6.

In alternative embodiment 319a shown in FIG. 10, two additional longitudinally extending intermediate rods 252b and 252c are tack welded to legs 249 and 245, respectively. In particular, upper intermediate rod 252c is tack welded to the inside surface of upper leg 245 between junction 254 and connection 248. Intermediate rod 252b is tack welded or otherwise attached to the inside surface of lower leg 249 between junction 254 and weld connection 251. Rods 252b and 252c have a diameter that is less than the diameter of center rod 252a. Bearing surfaces 253b and 253c of rods 252b and 252c, respectively, bear against outer surface 35 of upper shell 34 under certain loading conditions. As with the other embodiments, these longitudinally extending bearing rods provide compressive forces on shell 34 and underlying gasket 17 at intermediate positions to provide an improved seal when tapping sleeve 15 is tightened to the pipe.

Figure 11:
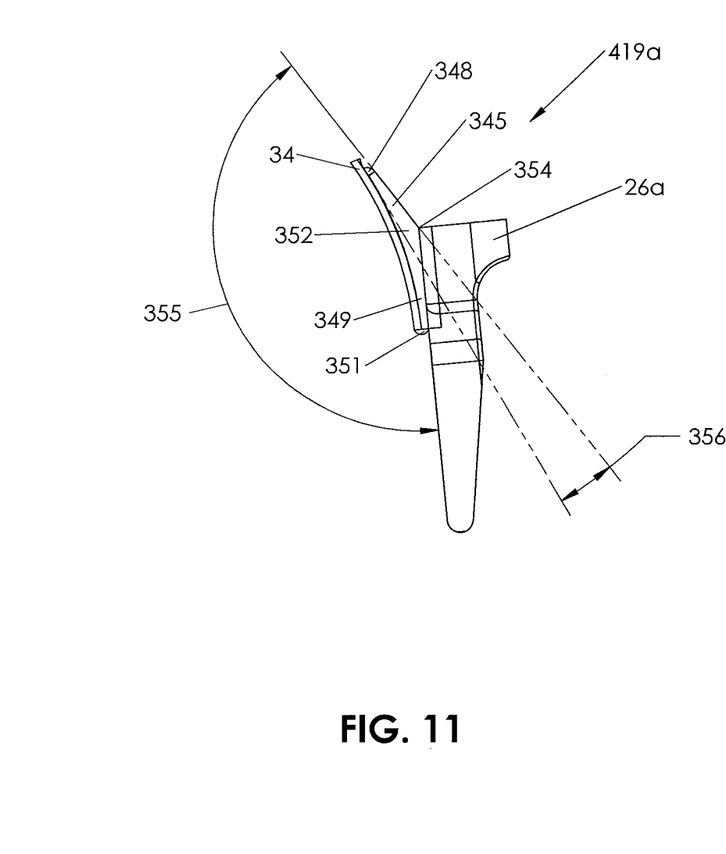
FIG. 11 is a fourth alternative embodiment of the side bar shown in FIG. 6.
Figure 12:
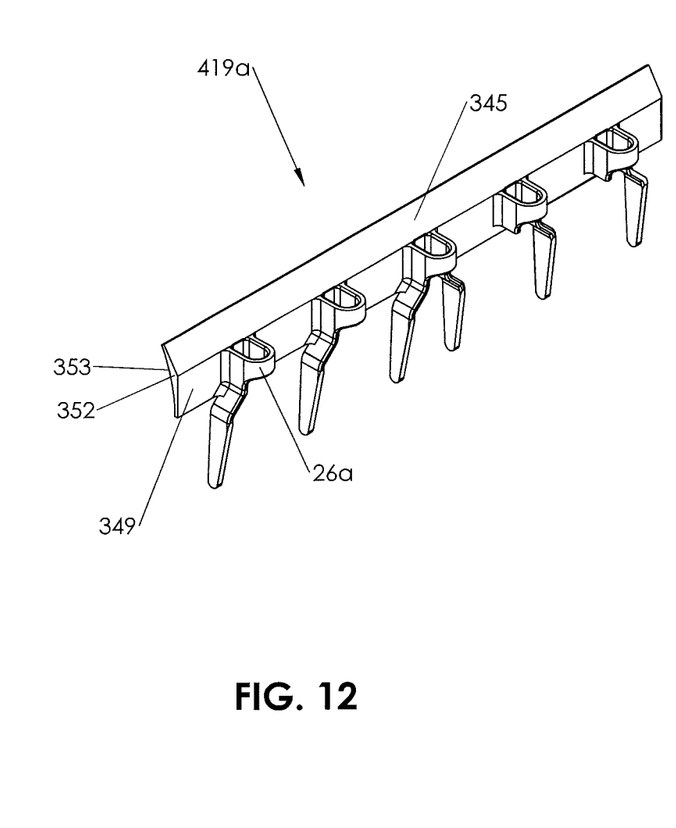
FIG. 12 is a right isometric view of the sidebar shown in FIG. 11.
Figure 13:
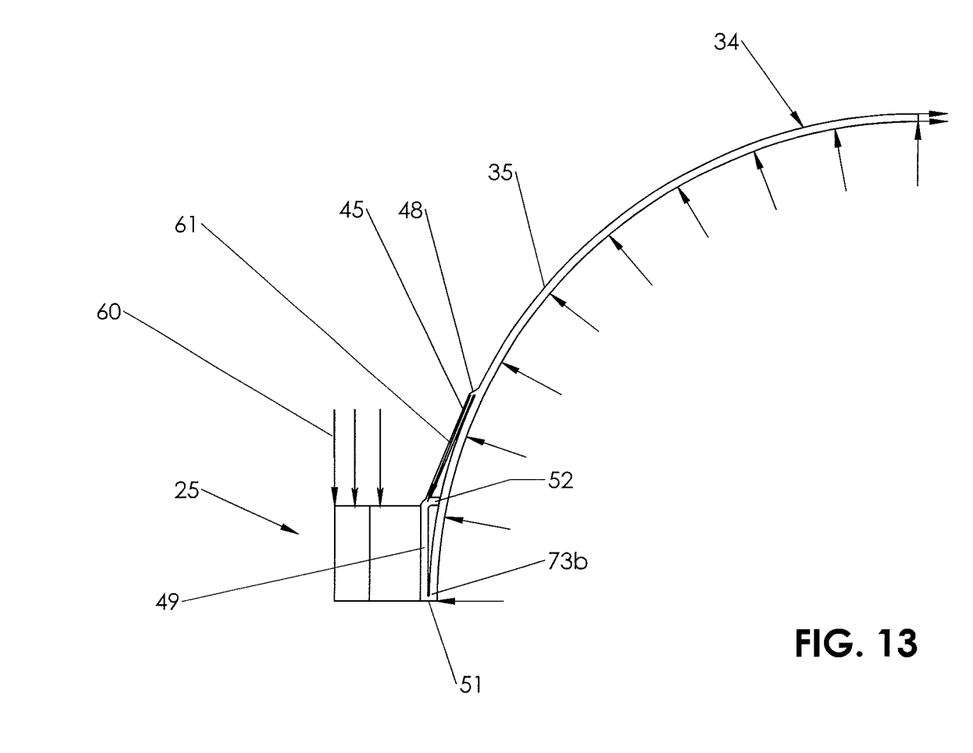
FIG. 13 is a schematic of the side bar shown in FIG. 1 with reaction forces when loaded.

FIGS. 11-12 show a fourth alternative embodiment side bar 419a. In this fourth embodiment 419a, the sidebar and lugs are provided as a single unitary cast member having an inner radius of curvature 353 appropriate for the upper shell 34 outside diameter. As shown, side bar 419a includes upper leg 345 connected at longitudinally extending junction 354 to lower leg 349, with upper leg 345 and lower leg 349 offset about junction 354 by inner angle 355. Upper leg 345 is connected at the upper end of shell 34 at longitudinally extending welded connection 348 and lower leg 349 is in turn welded at its lower longitudinally extending end to longitudinally extending edge 73a of shell 34 at longitudinally extending welded connection 351. As shown, upper leg 345 is connected to shell 34 at attachment 348 so as to provide an off tangent angle 356 of less than about 30 degrees, and preferably less than about 10 degrees. Curved longitudinally extending inner surface 353 of side bar 419a thereby bears against outer surface 35 of top shell 34 under loaded conditions.

A number of alternative spacers or bearing units may be used. For example, multiple rods of varying diameters may be used. Furthermore, such spacers may have alternative cross sections and could be oval, square or polygonal. As a further alternative, the bearing unit or units may have a continuous curved surface, such as surface 353 of sidebar 419a, having a curvature substantially similar to a corresponding curvature of outer surface 35 of shell 34.

The improved side bars provide a number of significant benefits. For example, as shown in FIG. 11, tightening nuts 20 on bolts 18 to load lugs 26 results in force vector 60, which in turn produces force transfer vector 61 on sidebar 19 and upper attachment weld 48 that is predominantly tangent to surface 35 of top shell 34 at longitudinally extending connection 48. Thus, in these embodiments, the resulting plane of the force transfer 61 in the upper leg, 45, 145, 245, 345, of each sidebar, 19a, 119a, 219a, 319a and 419a, respectively is in a direction offset from a plane tangent to upper shell 34 at the upper connection, 48, 148, 248 and 348, by less than about 30 degrees and preferably less than about 10 degrees. In certain embodiments, such tangent offset is less than 5 degrees and may be 3 degrees or less. The radial outward component of this force vector at upper attachment 48 is thereby greatly reduced compared to prior art side bar designs. Tightening bolts 18a-g pulls down on lugs 26a-g, making it want to rotate about the centroid of the side bar/shell cross section. This rotating moment is counteracted by the new tangent connections of the upper leg and lower leg to the shell. Thus, the movement about the upper connection point is reduced. These connections load the shell circumferentially instead of radially. The absence of an outwardly directed radial component of force maximizes the gasket loading of the sleeve to the gasket. The short inward facing bearing units places additional compressive forces on the sleeve and underlying gasket, thereby improving performance and the seal.

As shown in FIGS. 2-5, side bar 19b on the left side of upper shell 34 is of the same design as side bar 19a. Similarly, as shown in FIGS. 2 and 3, side bars 24a and 24b on lower shell 40 are of the same design as side bars 19a and 19b, just orientated upside down relative to side bars 19a and 19b. Thus, with reference to FIG. 3, side bar 24a comprises lower leg 45b having longitudinally extending edge 46b connected to lower shell 40 at longitudinally extending connection 48b and upper leg 49b connected at longitudinally extending edge 50b to the longitudinally extending edge 74a of shell 40 at longitudinally extending connection 51b. Lower leg 45b is offset from lower leg 49b about junction 54b by an inner angle greater than about 90 degrees and less than about 180 degrees, and preferably by less than about 120 degrees. Also, lower connection 48b is configured such that the plane of lower leg 45b has an off-tangent angle relative to a plane tangent to surface 35b of shell 40 at connection 48b of less than about 30 degrees, and preferably less than about 10 degrees. Side bar 24b is the same configuration as side bar 24a, just proximate to the other longitudinal edge 74b of lower shell 40.

As shown, a series of upper lugs 26a-g are welded to lower leg 49 of upper right side bar 19a, a series of lugs 25a-g are welded to upper left side bar 19b, a series of lugs 28a-g are welded to upper leg 49b of right lower side bar 24a, and a series of lugs 27a-g are welded to lower left side bar 24b. These lugs and side bars provide the necessary clearance outside of shells 34 and 40 for bolts 18a-n. Threaded bolts 18a-g extend between lugs 26a-g and 28a-g, respectively, and threaded bolts 18h-n extend between lugs 25h-n and lugs 27h-n, respectively. Corresponding nuts 20 are tightened on bolts 18 to draw opposed side bars 19a and 19b of top shell 34 and opposed side bars 24a and 24b of lower shell 40 together, thereby tightening sleeve 15 to the pipe.

The top shell 34 to branch 29 attachment connection 44, conventionally a welded lap joint, tended to stiffen a region of upper shell 34, which limited deflection (radial flexure) in the vicinity of branch 29 as sleeve 15 was tightened to the fluid carrying pipe. With specially-configured side-bars 19 and 24 and lugs 25-28, and by using a butt weld for connection 44, this stiffened region is reduced and more flexible regions are provided, resulting in an improved seal as sleeve 15 is tightened to the fluid carrying pipe. Furthermore, with a size-on-size connection, cut-outs in side bars 24a and 24b are not needed around connection 44 to allow for side bars 24a and 24b to be connected to upper shell 34.

As shown, lugs 25-28 are specially configured to include moment reaction wings 96, 97 and U-shaped lug openings 92 and 93 in upper lugs 26 and 25, with such openings being recessed or cut-away so that outer depth 98 of the opening is less than depth 99 closer to the side bar. Wings 96 and 97 engage lower shell 40 and thereby prevent the shell edges from creasing spanners 30 and 31, respectively, and snagging the outer surface of the spanners.

Upper lugs 26a-g have U-shaped lug openings 92 and upper lugs 25a-g have U-shaped lug-openings 93. This is another factor in increasing the range of sleeve 15. When used on a diameter pipe in the lower range, bolt 18 is more in alignment with lugs 25 and 27. In a diameter pipe on the upper range, although bolts 18 are not as aligned with lugs 25 and 27, because of U-shaped openings 92 and 93, the bolt 18 passages between upper and lower shells 34 and 40 remain open and are not partially blocked by the pipe. Also, the bolt heads of bolts 18 and nuts 20 on bolts 18 are permitted to migrate towards axis x-x in both the maximum and minimum diameters of the nominal tapping sleeve range.

In addition, lug openings 92 and 93 are recessed in depth near the bottom of the U, such that the outside depth 98 of the opening is less than the depth 99 closer to side bars. This allows bolts 18 to articulate in the respective lug opening, thereby permitting the hinging action, in which lower shell 40 is able to move in a hinged arc further away from the pipe. Thus, lugs 26 and 25 are configured such that bolts 18 can pivot in lug openings 92 and 93 relative to the mounting plates, such that shell 34 may engage the pipe and shell 40 may be moved from a first position substantially disengaged from the main fluid conduit to a second position engaging the main fluid conduit.

As shown in FIG. 1, lugs 25-28 include moment reactions wings 96 and/or 97. Lugs 26a-c are single tined, having a single downwardly extending outside left tine 96, as shown in FIG. 1. Lugs 26d-g are also single tined, having a single downwardly extending outside right tine 97. Opposing lugs 28a-c are also single tined, having an upwardly extending tine positioned on the other side of bolts 18a-c, respectively, to the single tines of lugs 26a-c. This orientation is switched with respect to lugs 26d-g and opposed lugs 28d-g, as shown in FIG. 1.

While side bar 19a and lugs 26a-g, for example, may be welded together, as an alternative they can be formed as a complete casting. In yet another alternative, four portions of side bar 19a and lugs 26a-g may be cast and then the four pieces welded at side bar joints to form the assembly part. As yet other alternatives, the side bars and lugs may be forged, extruded or molded to form a solid unitary piece.

Connections 21a and 21b result in less stiffening of the longitudinal ends of shells 34 and 40 and thereby allow sleeve 15 to flex and actuate gasket 32 to form a tight seal when connections 21a and 21b are tightened.

Near shell to branch transition 44, top shell 34 behaves as a rigid body. Between branch transition 44 and upper shell 34 side bars 19a and 19b, elastic bending occurs when bolts 18 are tightened. Also, elastic behavior of top shell 34 occurs at a distance from the body to branch transition 44, providing gasket compression at main seal bead 22. This elastic bending is utilized to energize specially configured gasket main seal 22, which provides for gasket sealing on an increased range of fluid carrying pipe diameters for a given sleeve size. Thus, gasket seal 22 is thicker where shell 34 will flex to allow that flexure and the resulting conformance of sleeve 15 to the diameter of pipe 16. Gasket seal 22 is thinner where shell 34 is more rigid and flexure is less likely to occur. The additional outlet seal bead thickness (stand off height) is also divided between the tapping sleeve shell side and the fluid carrying pipe side of the main matte sheet of the upper gasket to eliminate the potential for gasket rollover.

The present invention contemplates that many changes and modifications may be made. Therefore, while forms of the improved tapping sleeve assembly has been shown and described, and a number of alternatives discussed, persons skilled in this art will readily appreciate that various additional changes and modifications may be made without departing from the spirit of the invention, as defined and differentiated by the following claims.

The invention claimed is:

1. A tapping sleeve assembly comprising:
   a sleeve configured to clamp on to a main fluid conduit oriented about a longitudinal axis;
   said sleeve having a first shell member and a second shell member separate from said first shell member;
   a gasket disposed between said first shell member and said main fluid conduit;
   a branch aperture in said first shell member configured to communicate with a branch fluid conduit attached to said first shell member;
   a connecting assembly configured and arranged to tighten said first and said second shell members to said main fluid conduit from a non-actuated position to a tightened position;
   said connection assembly comprising:
      a first side bar element connected proximate to a longitudinally extending edge of said first shell member and a second side bar element connected proximate to a longitudinally extending edge of said second shell member;

multiple bolt receiving lugs extending from said first side bar element and multiple bolt receiving lugs extending from said second side bar element at corresponding positions along said longitudinal axis; and a bolt extending between each of said respective lugs on said first side bar element and said second side bar element;

said first side bar element comprising:

an upper leg having an upper edge and connected to said first shell member at an upper connection;

a lower leg having a lower edge and connected to said upper leg and supporting at least one of said bolt receiving lugs;

an intermediate bearing unit configured and arranged to bear against an outer surface of said first shell member between said upper edge of said upper leg and said lower edge of said lower leg; and said bearing unit having at least one bearing surface not affixed to said outer surface of said first shell member;

whereby said first side bar element and said second side bar element may be drawn towards each other to tighten said first and second members to said main fluid conduit.

2. The tapping sleeve set forth in claim 1, wherein said bearing unit comprises a bearing projection extending towards said outer surface of said first shell member from said lower leg.

3. The tapping sleeve set forth in claim 1, wherein said bearing unit comprises a bearing projection extending towards said outer surface of said first shell member from said upper leg and/or said lower leg.

4. The tapping sleeve set forth in claim 3, wherein said bearing projection comprises a longitudinally extending rod attached to said upper leg and/or said lower leg.

5. The tapping sleeve set forth in claim 4, wherein said rod is attached to said first side bar element at a junction between said upper leg and said lower leg.

6. The tapping sleeve set forth in claim 1, wherein said bearing unit comprises multiple bearing projections extending towards said outer surface of said first shell member from said upper leg and/or said lower leg.

7. The tapping sleeve set forth in claim 6, wherein each of said bearing projections comprises a longitudinally extending rod.

8. The tapping sleeve set forth in claim 1, wherein said bearing surface comprises a continuous curved surface having a curvature substantially similar to a corresponding curvature of said outer surface of said first shell member.

9. The tapping sleeve set forth in claim 1, wherein said upper leg comprises a longitudinally extending plate and said lower leg comprises a longitudinally extending plate connected to said upper leg plate.

10. The tapping sleeve set forth in claim 1, wherein said lower leg is connected to said shell at a lower connection.

11. The tapping sleeve set forth in claim 10, wherein said lower connection comprises a weld between said lower edge of said lower leg and said longitudinally extending edge of said first shell member.

12. The tapping sleeve set forth in claim 10, wherein said upper connection comprises a weld between said upper edge of said upper leg and said first shell member.

13. The tapping sleeve set forth in claim 1, wherein said first side bar element and lugs are formed as a unitary solid piece.

14. The tapping sleeve set forth in claim 1, wherein said lug comprises a moment reaction wing.

15. The tapping sleeve set forth in claim 1, wherein said gasket comprises an aperture seal and a circumferential seal bead.

16. The tapping sleeve set forth in claim 1, wherein said second side bar element comprises:

a lower leg having an lower edge and connected to said second shell member at a lower connection;

an upper leg having an upper edge and connected to said lower leg and supporting at least one of said bolt receiving lugs;

a bearing unit configured and arranged to bear against an outer surface of said second shell member between said lower edge of said lower leg and said upper edge of said upper leg; and said bearing unit having at least one bearing surface not affixed to said outer surface of said second shell member.

17. A tapping sleeve assembly comprising:

a sleeve configured to clamp on to a main fluid conduit oriented about a longitudinal axis;

said sleeve having a first shell member and a second shell member separate from said first shell member;

a gasket disposed between said first shell member and said main fluid conduit;

a branch aperture in said first shell member configured to communicate with a branch fluid conduit attached to said first shell member;

a connecting assembly configured and arranged to tighten said first and said second shell members to said main fluid conduit from a non-actuated position to a tightened position;

said connection assembly comprising:

a first side bar element connected proximate to a longitudinally extending edge of said first shell member and a second side bar element connected proximate to a longitudinally extending edge of said second shell member;

multiple bolt receiving lugs extending from said first side bar element and multiple bolt receiving lugs extending from said second side bar element at corresponding positions along said longitudinal axis; and a bolt extending between each of said respective lugs on said first side bar element and said second side bar element;

said first side bar element comprising:

an upper leg and a lower leg connected at a leg junction;

said upper leg connected to said first shell member at an upper force transfer connection;

said lower leg configured to apply a force to said first shell member at a lower force transfer connection;

said lower leg orientated relative to said upper leg such that an inner angle defined by the intersection of a first imaginary plane between said upper connection and said leg junction and a second imaginary plane between said lower connection and said leg junction is greater than about 90 degrees and less than about 180 degrees.

18. The tapping sleeve set forth in claim 17, wherein said inner angle is greater than about 120 degrees.

19. The tapping sleeve set forth in claim 17, wherein said lower leg is connected to said first shell member at said lower force transfer connection.

20. The tapping sleeve set forth in claim 19, wherein said lower force transfer connection comprises a weld between a lower edge of said lower leg and said longitudinally extending edge of said first shell member.

21. The tapping sleeve set forth in claim 17, wherein said upper force transfer connection comprises a weld between an upper edge of said upper leg and said first shell member.

22. A tapping sleeve assembly comprising:
a sleeve configured to clamp on to a main fluid conduit oriented about a longitudinal axis;
said sleeve having a first shell member and a second shell member separate from said first shell member;
a gasket disposed between said first shell member and said main fluid conduit;
a branch aperture in said first shell member configured to communicate with a branch fluid conduit attached to said first shell member;
a connecting assembly configured and arranged to tighten said first and said second shell members to said main fluid conduit from a non-actuated position to a tightened position;
said connection assembly comprising:
a first side bar element connected proximate to a longitudinally extending edge of said first shell member and a second side bar element connected proximate to a longitudinally extending edge of said second shell member;
multiple bolt receiving lugs extending from said first side bar element and multiple bolt receiving lugs extending from said second side bar element at corresponding positions along said longitudinal axis; and
a bolt extending between each of said respective lugs on said first side bar element and said second side bar element;
said first side bar element comprising:
an upper leg and a lower leg connected at a leg junction;
said upper leg connected to said first shell member at an upper force transfer connection;
said lower leg configured to apply a force to said first shell member at a lower force transfer connection;
said lower leg orientated relative to said upper leg such that an off-tangent angle defined by an intersection of a first imaginary plane tangent to said first shell member at said upper force transfer connection and a second imaginary line between said upper force transfer connection and said leg junction is less than about 30 degrees.

23. The tapping sleeve set forth in claim 22, wherein said off-tangent angle is less than about 10 degrees.

24. The tapping sleeve set forth in claim 22, wherein said off-tangent angle is less than about 5 degrees.

25. The tapping sleeve set forth in claim 22, wherein said lower leg is connected to said first shell member at said lower force transfer connection.

26. The tapping sleeve set forth in claim 25, wherein said lower force transfer connection comprises a weld between a lower edge of said lower leg and said longitudinally extending edge of said first shell member.

27. The tapping sleeve set forth in claim 22, wherein said upper force transfer connection comprises a weld between an upper edge of said upper leg and said first shell member.

28. A tapping sleeve assembly comprising:
a sleeve configured to clamp on to a main fluid conduit oriented about a longitudinal axis;
said sleeve having a first shell member and a second shell member separate from said first shell member;
a gasket disposed between said first shell member and said main fluid conduit;
a branch aperture in said first shell member configured to communicate with a branch fluid conduit attached to said first shell member;
a connecting assembly configured and arranged to tighten said first and said second shell members to said main fluid conduit from a non-actuated position to a tightened position;
said connection assembly comprising:
a first side bar element connected proximate to a longitudinally extending edge of said first shell member and a second side bar element connected proximate to a longitudinally extending edge of said second shell member;
multiple bolt receiving lugs extending from said first side bar element and multiple bolt receiving lugs extending from said second side bar element at corresponding positions along said longitudinal axis; and
a bolt extending in a first load plane between each of said respective lugs on said first side bar element and said second side bar element;
said first side bar element comprising:
an upper leg and a lower leg connected at a leg junction;
said upper leg configured to transfer a force to said shell member at an upper connection in a force transfer plane;
said lower leg configured to apply a force to said first shell member at a lower force transfer connection;
said lower leg orientated relative to said upper leg such that an off-tangent angle defined by an intersection of a first imaginary plane tangent to said first shell member at said upper force transfer connection and said force transfer plane is less than about 30 degrees.

29. The tapping sleeve set forth in claim 28, wherein said off-tangent angle is less than about 10 degrees.

30. The tapping sleeve set forth in claim 29, wherein said off-tangent angle is less than about 5 degrees.

31. The tapping sleeve set forth in claim 28, wherein said upper leg is connected to said first shell member at said upper force transfer connection and said lower leg is connected to said first shell member at said lower force transfer connection.

32. The tapping sleeve set forth in claim 31, wherein said upper force transfer connection comprises a weld between an upper edge of said upper leg and first shell member and said lower force transfer connection comprises a weld between a lower edge of said lower leg and said longitudinally extending edge of said first shell member.

* * * * *